United States Patent Office

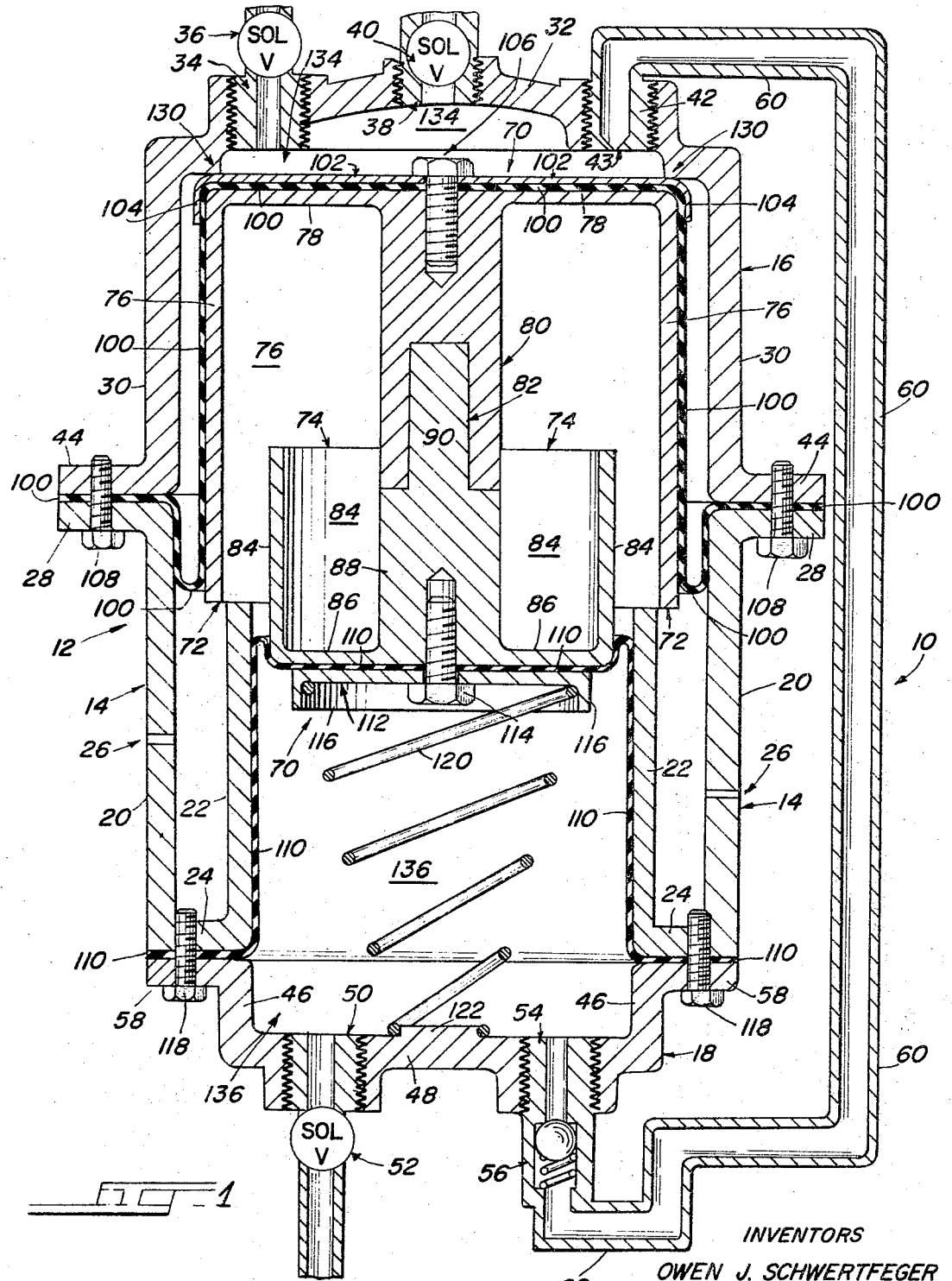

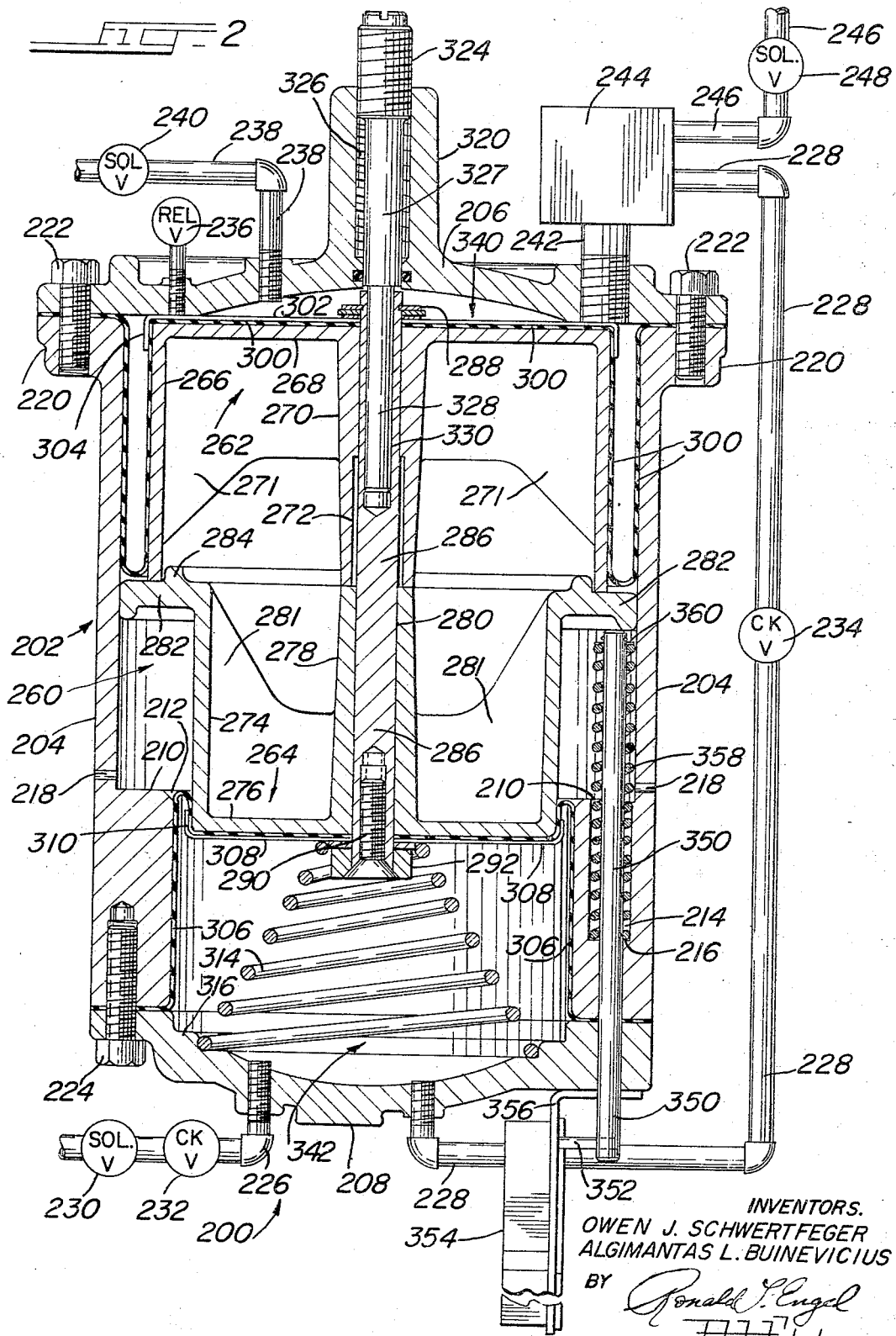

3,323,783
Patented June 6, 1967

3,323,783
GAS-LIQUID CONTACTING DEVICE
Owen J. Schwertfeger, Chicago, and Algimantas L. Buinevicius, Palos Park, Ill., assignors to The Seeburg Corporation, Chicago, Ill., a corporation of Delaware
Filed Feb. 23, 1966, Ser. No. 529,354
14 Claims. (Cl. 261—35)

This invention relates to a device adapted for use in contacting a gas and a liquid and more specifically to a device suitable for incorporation in a soft drink vending installation and adapted to formulate predetermined metered volumes of carbonated water quickly and efficiently.

Beverage vending installations adapted to dispense freshly formulated soft drink beverages in response to customer selection require a gas-liquid contacting device capable of quickly producing accurately measured volumes of carbonated water from carbon dioxide gas and water. A gas absorption apparatus designed for this purpose is described in Hotchkiss, United States Patent No. 3,109,-873, patented Nov. 5, 1963. The Hotchkiss device employs a cylinder provided with a slidable piston which serves to define two chambers (i.e., a head end chamber and a rod end chamber). A piston rod extends from the piston through the rod end chamber to a point external to the cylinder. Thus, the effective area of the piston presented to the rod end chamber is smaller (by an area corresponding to the cross-sectional area of the piston rod) than that presented to the head end chamber. Valve controlled liquid inlet means are provided for the rod end chamber, and valve controlled gas inlet means as well as valve controlled outlet means for withdrawing liquid having gas absorbed therein are provided for the head end chamber. A valved passageway extends through the piston and thereby connects the two chambers.

In operation, the Hotchkiss device functions to receive liquid in the rod end chamber. Gas is then received in the head end chamber, and liquid passes under pressure from the rod end chamber through the valved passageway in the piston and is sprayed into the head end chamber. In this manner, the gas is absorbed in the liquid so that, upon completion of the operating cycle, liquid having gas absorbed therein may be withdrawn from the head end chamber.

Certain structural and operational deficiencies have been exhibited by the device disclosed in the Hotchkiss patent when employed under actual working conditions. The conventional sliding piston provided within the cylinder is subject to wear and tear, and, as a result, the normal fluid-tight seal between the piston and the cylinder (and hence between the head end chamber and the rod end chamber) is thereby impaired. Moreover, the valve passageway extending through the piston has proven to be unnecessarily complex and, as a result, poses problems from a manufacturing and maintenance standpoint.

The present invention provides a new and unique gas-liquid contacting device, especially designed to avoid the difficulties which have been experienced with the Hotchkiss-type device. Briefly described, one embodiment of the present invention disclosed herein comprises a housing having a first chamber and a second chamber divided by a slidable, flexible double diaphragm piston assembly. The diameter of the first chamber is greater than that of the second so that the effective area of the diaphragm presented to the first chamber is larger than that presented to the second chamber. Valve controlled liquid inlet means are provided in association with the second chamber, and valve controlled inlet means are provided in association with the first chamber. Also, valve controlled outlet means are provided in association with the first chamber in order that a gas-liquid mixture may be drawn off at the end of an operational cycle. External passageway means are provided between the first and second chambers, and check valve means are provided in the passageway so as to provide for unidirectional liquid flow from the second chamber to the first chamber under certain predetermined conditions.

In accordance with a preferred embodiment of the present invention, the first chamber comprises a main gas-liquid contacting portion and a smaller, gas-liquid premixing portion in fluid communication with the main portion, the gas inlet means and the external passageway means being in fluid communication with the premixing portion of the first chamber.

In operation, with the diaphragm assembly positioned as far as possible toward the first chamber, so that the volume of the second chamber is large relative to that of the first, liquid flows through the liquid inlet means into and fills the second chamber. Thereafter, gas is introduced into the premixing portion of the first chamber and thence into the main portion of the first chamber via the gas inlet means, and the movable diaphragm assembly slides toward the second chamber so as to diminish the volume thereof and simultaneously to increase the volume of the first chamber. As a result, liquid flows through the check valve and external passageway means from the second chamber into the premixing portion of the first chamber whereby the liquid and gas are initially contacted via a Venturi action. The gas-liquid premixture then passes into the main portion of the first chamber where the contacting process continues to completion. When the diaphragm assembly has attained its extreme position in the direction of the second chamber, the liquid-gas mixture is withdrawn through the outlet means, and the diaphragm assembly is restored to its original rest position.

In accordance with an alternative embodiment of the present invention, the first chamber may be unitary in character (i.e., as opposed to the above-noted combination of a main portion and a premixing portion) and the gas inlet means and the external passageway means may be in direct fluid communication with the unitary first chamber. When this arrangement is employed, spray nozzle means are preferably provided at the juncture of the passageway means and the first chamber whereby liquid flowing through the passageway means is sprayed into the passageway means in order to facilitate absorption of the gas by the liquid. However, in all other operational respects, the two embodiments are identical.

A primary object of the present invention is to provide a new and improved gas-liquid contacting device.

Another object of the present invention is to provide a device of the character described embodying a slidable double diaphragm assembly which improves the operation of the device and which minimizes the maintenance problems associated therewith.

Yet another object is to provide a gas-liquid contacting device of the character described especially adapted for use in a beverage vending installation, wherein carbon dioxide and water are contacted so as to provide carbonated water useful in formulating soft drink beverages vendible from the vending installation.

A further object of the present invention is to provide a double diaphragm carbonator device of the character described which is dependable in operation and which is inexpensive to manufacture and maintain.

A still further object of the present invention is to provide a double diaphragm carbonator device including a premixing chamber in which a Venturi-type gas-liquid absorption occurs, the gas-liquid premixture thereafter passing into a main chamber of the carbonator device in which further absorption occurs.

These and other objects, advantages, and features of the present invention will hereinafter appear, and for purposes of illustration, but not of limitation, exemplary embodiments of the present invention are shown in the accompanying drawings in which:

FIGURE 1 is a sectional view taken substantially through the center of a gas-liquid contacting device produced in accordance with the present invention; and FIGURE 2 is an elevational view, partially in section, of a preferred gas-liquid contacting device produced in accordance with the present invention.

With reference to FIGURE 1, a gas-liquid contacting device 10 comprises a housing 12 formed of a central housing member 14, a dome end housing member 16, and a flat end housing member 18. Members 14, 16, and 18 are fabricated of any suitable material, preferably metal, and are strong enough to withstand the pressures exerted by the carbon dioxide or other gas used in the contacting process. The central member 14 is generally cylindrical and comprises an outer wall 20 and an inner wall 22 which are preferably integrally interconnected by a connecting member 24. A pair of openings 26 are provided in outer wall 20 in order to vent the pressure in the area between walls 20, 22 to atmospheric pressure. An outwardly turned flange 28 is formed along the upper edge of outer wall 20 for a purpose that will hereinafter appear.

Dome end housing member 16 preferably comprises a downwardly extending annular side wall 30 and a dome end member 32 preferably formed integrally with side wall 30. An outwardly turned flange 44 is provided along the lower edge of side wall 30 of dome end housing member 16 for a purpose that will hereinafter appear. Three openings are provided in dome end member 32, and a fitting is provided in each opening. Thus, a gas inlet fitting 34, provided with a solenoid check valve 36, is provided in the first opening; a mixture outlet fitting 38, provided with a solenoid check valve 40, is provided in the second opening; and a liquid inlet 42 (hereinafter described in greater detail) is provided in the third opening. Inlet 42 terminates in a spray nozzle 43 for a purpose that will hereinafter appear.

Flat end housing member 18 comprises an annular side wall 46 and a generally flat end piece 48 which is preferably integrally formed therewith. A pair of openings are provided in end piece 48, and a fitting is provided in each opening. Thus, a liquid inlet fitting 50, provided with a solenoid check valve 52, is provided in the first opening, and a liquid outlet fitting 54, provided with a spring-type check valve 56, is provided in the second opening. An outwardly turned flange 58 is provided along the upper edge of side wall 46 for a purpose that will hereinafter appear.

Liquid outlet fitting 54 and liquid inlet fitting 42 are interconnected by an external passageway 60 through which liquid flows under certain predetermined conditions (hereinafter described in detail).

A slidable double diaphragm assembly 70 is provided within housing 12. Assembly 70 comprises a large support member 72 and a small support member 74. Large support member 72 comprises an annular side wall 76, a generally flat end wall 78, and a downwardly projecting center column 80. Column 80 has an annular opening 82 formed therein for a purpose that will hereinafter appear.

Small support member 74 comprises an annular side wall 84, a generally flat end wall 86, and an upwardly projecting column 88. A stud portion 90 of column 88 nestingly extends into the opening 82 in column 80 in the manner shown in FIGURE 1, and stud 90 is preferably press-fitted into opening 82 so that support members 72, 74 are held together and are slidable as an integral unit.

A first diaphragm member 100 is stretched across upper support member 76 and is clamped thereto by means of a retaining piece 102 having an annular side flange 104 and a bolt 106 which is threaded into a suitable opening in column 80.

The outer edge of diaphragm 100 is disposed between flange 44 of dome end housing member 16 and flange 28 of central housing member 14. Flanges 28 and 44 (with diaphragm 100 held therebetween) are clamped together by a suitable plurality of bolts 108 (two of which are shown in FIGURE 1).

A second diaphragm 110 is stretched across top wall 86 of small support member 74 and is clamped thereto by means of a clamping member 112 and a bolt 114 which is threaded into a suitable opening in column 88. Clamp member 112 is provided with an annular side flange 116 for a purpose that will hereinafter appear. The outer edge of diaphragm 110 is clamped between flange 58 of flat end housing member 18 and connecting member 24 of dome end housing member 16 by a suitable plurality of bolts 118.

Diaphragms 100, 110 may be made of any suitable flexible, fluid-tight material. Neoprene or rubber diaphragms are preferably employed in fabricating the device of the present invention, although many suitable materials will be obvious to one skilled in the art.

The double diaphragm assembly 70 is slidable within the housing 12 between the position shown in FIGURE 1 (which is the extreme position in the direction of the dome end of the housing 12) and a position wherein flange 116 of clamp member 112 is positioned adjacent flat end piece 48 (which is the extreme position in the direction of the flat end of sousing 12). When the double diaphragm assembly 70 is positioned as shown in the drawing, clamp member 102 adjacent its outer edge abuts against an annular shoulder rim 130 formed on the inner surface of dome end piece 32.

As the assembly 70 moves toward the flat end from the position shown in the drawing, annular wall 76 of support member 72 moves into the annular space defined by inner wall 22 and outer wall 20 of central housing member 14. At the same time, annular inner wall 22 moves into the space between annular wall 76 of support member 72 and annular wall 84 of support member 74. As the diaphragm assembly 70 reciprocates between its respective extreme positions, diaphragms 100, 110 move with the assembly and maintain a fluid-tight seal between the respective areas within the housing 12.

A coil spring 120 is seated against clamp member 112 and is maintained therein by flange 116 of member 112. The other end of spring 120 is seated about a projecting stud 122 formed on the inner surface of end piece 48. Spring 120 is provided in order to bias the double diaphragm assembly toward the position shown in FIGURE 1 (i.e., the position wherein the assembly 70 is disposed adjacent the dome end of the housing 12).

Assembly 70 and end housing members 16, 18 cooperate to define a dome end chamber 134 (i.e., the volume generally above diaphragm 100) and a flat end chamber 136 (i.e., the volume generally below diaphragm 110). The respective volumes of chambers 134, 136 are of course determined by the position of the double diaphragm assembly 70 within the housing 12 at any given time. Thus, as assembly 70 moves from the position shown in FIGURE 1 toward the flat end of the housing 12, the volume of chamber 136 diminishes and the volume of chamber 134 increases.

A suitable liquid (e.g., water) may be introduced into chamber 136 through the previously described check valve 52 and fitting 50. A suitable gas (e.g., carbon dioxide) may be introduced into chamber 134 through check valve 36 and fitting 34. In accordance with the operation of the gas-liquid contacting device 10 of the present invention, when pressurized carbon dioxide is introduced into chamber 134 after chamber 136 has been filled with water, the double diaphragm assembly moves from the position shown in FIGURE 1 toward the flat end of the housing. The water (which is compressed thereby) then flows through fitting 54, check valve 56, and passageway 60 and is sprayed through spray nozzle 43 of fitting 42 into the carbon dioxide gas atmosphere of chamber 134. The spraying of liquid through fitting 42 into the gas in chamber 134 causes the liquid to contact the gas and to be intimately admixed therewith. When the assembly 70 reaches the flat end of the housing (i.e., when all of the liquid has been sprayed into chamber 134), the carbonated water mixture then present in chamber 134 may be withdrawn therefrom through fitting 38 and check valve 40.

To effect removal of the carbonated water from chamber 134, spring 120 acts to restore double diaphragm assembly 70 to the position shown in the drawing, thereby serving to pump the carbonated water mixture out through fitting 30. However, as will be obvious to one skilled in the art, the device described herein can function even without spring 120 since the pressure of the water pumped into chamber 136 may be employed to return assembly 70 to the position shown in the drawing (and hence to pump the carbonated water mixture out of chamber 134).

Reciprocal movement of assembly 70 occurs by virtue of the dimensions of the housing 12 and assembly 70 and the conditions under which the liquid-gas contact process is carried out. When carbon dioxide gas is first introduced into chamber 134 under pressure, assembly 70 undergoes movement in the direction of the flat end in order to attain static equilibrium. However, attainment of static equilibrium would result in a relatively greater pressure being exerted in chamber 136 than in chamber 134 because the effective area of the diaphragm presented to chamber 134 is larger than the area of the diaphragm presented to chamber 136. Neglecting the weight of assembly 70, the weight of carbon dioxide and water, and the frictional forces involved, static equilibrium for assembly 70 requires that the product of the pressure exerted within chamber 134 and the effective area of diaphragm 100 be equal to the product of the pressure exerted in the chamber 136 and the effective area of the diaphragm 110. Since the effective area of diaphragm 110 is less then the effective area of diaphragm 100, the pressure within chamber 136 at static equilibrium must, of necessity, be greater than the pressure exerted within chamber 134.

As assembly 70 approaches an instantaneous static equilibrium position, the pressure exerted within chamber 136 is accordingly greater than the pressure exerted within chamber 134, and the greater relative pressure in chamber 136 causes check valve 56 to open to allow water to flow from chamber 136 through fitting 54, check valve 56, passageway 60, and nozzle 43 into chamber 134 through fitting 42 and spray nozzle 43. The flow of water through external passageway 60 from chamber 136 to chamber 134 alters the pressures within the two chambers and the instantaneous static equilibrium is lost. In an effort to retain static equilibrium, assembly 70 continues to move further in the direction of the flat end, and (as a result of the re-established pressure gradient between chambers 136 and 134) water continues to flow through external passageway 60 from chamber 136 to chamber 134. Thus, assembly 70 continues to move until its position adjacent the flat end is attained, at which time essentially all of the water from chamber 136 will have been forced through external passageway 60 into chamber 134.

As previously noted, when this water transfer is completed, check valve 40 is adapted to open and permit the carbonated water mixture to be withdrawn from chamber 134 (as spring 120 forces assembly 70 toward the position shown in the drawing).

As will be obvious to one skilled in the art, conventional controlling means (such as a timing cam system for energizing control solenoids in a predetermined pattern, not shown) may be provided in order to open and close solenoid valve 36, 52, and 40 in order to govern the sequence of operation for the device 10. The sequence of operation of the valves can be briefly summarized as follows. Initially, valve 52 is opened allowing water to flow into chamber 136 until chamber 136 is filled, at which time valve 52 is closed. Then, valve 36 is opened allowing carbon dioxide gas to flow into chamber 134 and thus causing pressure to build up in chamber 134. Assembly 70 then moves in the direction of the flat end in the previously described manner. Valve 36 is maintained open so as to maintain the gas pressure in chamber 134 substantially constant throughout the movement of assembly 70. As assembly 70 moves toward the flat end, the pressure build-up in chamber 136 causes check valve 56 to open, and water passes through the external passageway 60 from chamber 136 to chamber 134. Water continues to flow from chamber 136 to chamber 134 as assembly 70 continues its movement until it reaches a position adjacent the flat end of housing 12. Valve 36 is then closed, and valve 40 is opened so that the carbonated mixture is withdrawn through valve 40 as assembly 70 returns to the position shown in the drawing under the influence of spring 120.

From the described operation, it will be obvious that check valve 56 opens whenever the pressure exerted within chamber 136 exceeds the pressure exerted in chamber 134. Thus, it is the movement of the assembly 70 toward its static equilibrium position (resulting in the increase in pressure within chamber 136 relative to that in chamber 134) which causes check valve 56 to open and permit water to flow from chamber 136 to chamber 134.

A preferred gas-liquid contacting device 200 is shown in FIGURE 2. Device 200 comprises a housing 202 formed of a central housing member 204, and a pair of end housing members 206, 208. Members 204, 206, and 208 are fabricated of any suitable material, preferably metal, and are sufficiently strong to withstand the pressures exerted by the carbon dioxide or other gas used in the contacting process. The central housing member 204 is generally cylindrical and an annular shoulder 210 is provided at one end thereof in order to diminish the inside diameter of one end of member 204. The edge of shoulder 210 is beveled as indicated at 212. An annular opening 214 provided with a shoulder 216 is provided in member 204 for a purpose that will hereinafter appear. A pair of vents 218 are provided in member 204 in order to prevent an unwanted pressure build-up within the interior of housing 202.

A flange 220 is provided along the upper edge of central housing member 204 and end member 206 is fastened thereto by means of a plurality of bolts 222. Likewise, end member 208 is fixed to central housing member 204 by means of a plurality of bolts 224 (only one of which is visible in the drawing).

Two openings are provided in end housing member 208, a liquid inlet conduit 226 being threaded into one of the openings and an external connecting passageway conduit 228 being threaded into the other opening. A solenoid valve 230 is provided in conduit 226 to regulate fluid flow, and, in addition, a check valve 232 is also provided in conduit 226 in order to prevent fluid from flowing from the interior of member 204 through conduit 226. Similarly, a check valve 234 is provided in conduit 228 in order to provide for unidirectional flow of liquid through conduit 228.

Three openings are provided in end housing member 206. A relief check valve 236 is threaded into one of the openings in order that the pressure within housing 202 does not exceed a predetermined level. A gas-liquid mixture outlet conduit 238 is threaded into another opening, a solenoid valve 240 being provided in conduit 238 in order to regulate the flow of gas-liquid mixture therethrough. A transfer conduit 242 is threaded into the third opening in end housing member 206, thereby serving to provide for fluid communication between the interior of housing 202 and the interior of a hollow premixing chamber 244. External connecting passageway conduit 228 is connected with chamber 244 so that liquid flowing through conduit 228 may pass into the hollow interior of chamber 244.

A gas supply conduit 246 is also connected to chamber 244 so that gas passing through conduit 246 passes into the hollow interior of premixing chamber 244. A solenoid valve 248 is provided in conduit 246 in order to regulate the flow of gas through conduit 246.

A slidable double diaphragm assembly 260 is provided within housing 202. Assembly 260 comprises a first support member 262 and a second support member 264. First support member 262 comprises an annular side wall 266, a generally flat end wall 268, and a downwardly projecting center column 270. Column 270 has an annular opening 272 formed therein for a purpose that will hereinafter appear. Strength imparting webs 271 are provided in order to increase the strength of first support member 262.

Second support member 264 comprises an annular side wall 274, a generally flat end wall 276, and an upwardly projecting column 278. Column 278 has an annular opening 280 formed therein for a purpose that will hereinafter appear. Strength imparting webs 281 are provided in order to increase the strength of second support member 264.

An outwardly turned flange 282, the outside diameter of which is slightly less than the inside diameter of the upper portion of central housing member 204, is preferably integrally formed with annular side wall 274. A rim 284 is provided on the top surface of flange 282 and the lower edge of side wall 266 is adapted to contact flange 282 as shown in the drawing.

A rod 286 passes through openings 272, 280 in columns 270, 278 (the ends of which abut against one another). A retainer 288 is fixed to one end of rod 286, and a bolt 290 and a retaining washer assembly 292 are provided at the other end of rod 286 whereby first and second support structures 262, 264 of assembly 260 are held together.

A first diaphragm member 300 is stretched across first support member 262 and is clamped thereto by means of a retaining piece 302 having a depending annular side flange 304. Retaining piece 302 is clamped into position by retainer 288 and rod 286. The edge of diaphragm 300 is disposed between flange 220 and the edge of end housing member 206, which are clamped together in the previously described manner.

A second diaphragm 306 is stretched across flat end 276 of second support member 264 and is clamped thereto by means of a retaining piece 308, having an annular upturned flange 310. Retaining piece 308 is clamped in position by means of retaining washer assembly 292, bolts 290, and rod 286. The edge of diaphragm 306 is clamped between the edge of end housing member 208 and the end of central housing member 204, which are clamped together in the previously described manner.

Diaphragms 300, 306 may be made of any suitable flexible, fluid-tight material. Neoprene or rubber diaphragms are preferably employed in fabricating the device of the present invention, although many suitable materials will be obvious to one skilled in the art.

The double diaphragm assembly 260 is slidable within housing 202 between the position shown in the drawing (which is the extreme position in the direction of end housing member 206) and a position wherein flange 282 of second support member 264 is positioned adjacent shoulder 210 of central housing member 206 (which is the extreme position in the direction of the end housing member 208). Thus, assembly 260 is reciprocable between two extreme positions, diaphragms 300, 306 moving with the assembly and serving to maintain an almost frictionless fluid-tight seal between the various areas within housing 202.

One end of a coil spring 314 is seated about washer assembly 292, the other end of spring 314 being seated within a shoulder 316 formed on the interior of end housing member 208. Spring 314 is provided in order to bias the double diaphragm assembly 260 toward the position shown in the drawing (i.e., the position wherein assembly 260 is disposed adjacent end housing member 206).

Means are preferably provided in order to adjust the length of the stroke of assembly 260 in accordance with the preferred embodiment of the present invention. To this end, an upstanding annular column 320 is formed centrally in end housing member 206, and a stroke adjusting bolt 322, having a threaded hub 324, is threadably received in an annular opening 326 formed in column 320. Bolt 322 is shown in a retracted position in FIGURE 2, that is, its lower end is disposed above the lower edge of member 206. By threading bolt 322 into opening 326, the lower end thereof may be moved downwardly to a position wherein it extends into the interior of housing 202. An abutting rod 328 is fixed within an opening 330 in rod 286. The upper end of rod 328 is adapted to abut against the lower end of bolt 322 as assembly 260 moves toward the position shown in the drawing.

The extent of movement of assembly 260 toward end housing member 206 may be adjusted by varying the position of bolt 322. For example, with bolt 322 disposed in the position shown in the drawing, assembly 260 can move toward member 206 until retaining piece 302 abuts against the inside of member 206. However, with bolt 322 threaded downwardly into opening 326, the lower end of bolt 322 is disposed within chamber 302 (i.e., below the inside surface of member 206) so that as assembly 260 moves toward member 206, rod 328 contacts the end of bolt 322 before retaining piece 302 contacts the inside surface of member 206. Thus, by appropriate placement of bolt 322, the extent of movement of assembly 260 may be accurately controlled.

Double diaphragm assembly 260 and end housing members 206, 208 cooperate to define a first chamber 340 (i.e., the volume generally above diaphragm 300) and a second chamber 342 (i.e., the volume below diaphragm 306). The respective volumes of chambers 340, 342 at any given time are, of course, determined by the position of the assembly 260 within housing 202 at such time. Thus, as assembly 260 moves from the position shown in the drawing toward end housing member 208, the volume of chamber 342 diminishes and the volume of chamber 340 increases. In addition, by adjusting the position of bolt 322, the minimum volume of chamber 340 and hence the maximum volume of chamber 342 may be adjusted.

One additional structural feature is preferably employed in connection with device 200 in order to contribute to the operational control thereof. A push rod 350 is provided in the previously described opening 214 formed in shoulder 210 of central housing member 204. The upper end of rod 350 abuts against the lower edge of flange 282, and the lower end of rod 350 passes through openings in diaphragm 306 and end housing member 208 and extends to a point below the device 200. A switch actuating tab 352 is fixed to rod 350 adjacent the lower end thereof and is adapted to contact the actuator (not shown) of a conventional switch 354, which is mounted below end housing member 208 by means of a bracket 356. A coil spring 358 is positioned within opening 214, the lower end thereof abutting against previously described shoulder 216, and the upper end thereof being held in position by a retainer 360, which is fixed to the upper end of rod 350. In this manner, rod 350 is biased toward positions shown in the drawing.

As will be obvious to one skilled in the art, as assembly 260 moves downwardly toward member 208 and away from member 206 (so as to enlarge the volume of chamber 340 and diminish the volume of chamber 342), rod 352 is caused to move downwardly (against the bias of spring 358) and, as assembly 260 approaches end housing member 208, actuating tab 352 contacts the actuator (not shown) of switch 354 and causes switch 354 to reverse, thereby accomplishing a switching function.

The operation of the device 200 is, save for the premixing chamber 244, in all respects similar to that of the previously described device 10. Thus, reciprocal movement of assembly 260 occurs by virtue of the larger effective area presented to chamber 340 by diaphragm 300 relative to the effective area presented to chamber 342 by diaphragm 306. Conventional controlling means (such as a timing cam system for energizing solenoid valves 230, 240, and 248 in accordance with a predetermined pattern, not shown) may be provided in order to control the flow of fluid in conduits 226, 238, and 246.

The sequence of operation for device 200 may briefly be summarized as follows. With the assembly 260 disposed in the position shown in FIGURE 2 and with valves 230, 240, and 248 initially closed, valve 230 is opened allowing a suitable liquid (e.g., water) to flow into chamber 342 via conduit 226 until chamber 342 is filled, at which time valve 230 is closed. Thereafter, valve 248 is opened allowing a suitable gas (e.g., carbon dioxide) to flow through conduit 246 into premixing chamber 244 and thence into chamber 340 via connecting conduit 242. Thus, a pressure build-up occurs in chamber 340. Assembly 260 then moves in the direction of end housing member 208 in the previously described manner. Valve 248 remains open so as to maintain the carbon dioxide pressure in chamber 340 substantially constant throughout the movement of assembly 260. As assembly 260 moves toward end housing member 208, the pressure build-up in chamber 342 causes check valve 234 in connecting passageway 228 to open, and water passes through the external passageway 238 from chamber 342 into premixing chamber 244, where an initial Venturi-type mixing occurs between the carbon dioxide and water.

After the initial gas-liquid mixing occurs in premixing chamber 244, the resulting premixture passes through connecting conduit 242 into chamber 340, where the final mixing occurs. Liquid continues to flow from chamber 342 into premixing chamber 244 and thence into chamber 340 until assembly 260 reaches a position adjacent end housing member 208. Valve 248 is then closed and valve 240 is opened so that the gas-liquid mixture (e.g., carbonated water) is withdrawn through conduit 238 as assembly 260 returns to the position shown in FIGURE 2 under the influence of coil spring 314. Premixing chamber 244 and chamber 340 cooperate to define a volume in which gas-liquid mixing occurs, the volume of premixing chamber 244 being small relative to that of main chamber 340. Thus, as used in the appended claims, the term "first chamber" should be understood to encompass the combined area defined by premixing chamber 244 and main chamber 340.

Since switch 354 is actuated when assembly 260 reaches its position adjacent end housing member 208, switch 354 may, in combination with conventional circuitry (not shown), conveniently be employed to control the energization and de-energization of the solenoids for valves 240, 248 so that the opening of valve 240 and the closing of valve 248 may be appropriately coordinated with the other steps of the operational cycle.

From the described operation, it is obvious that check valve 234 opens whenever the pressure exerted within chamber 342 exceeds the pressure exerted in chamber 340. Thus, it is the movement of assembly 260 toward its static equilibrium position (resulting in the increase in pressure within chamber 342 relative to that in chamber 340) which causes check valve 234 to open and permit liquid to flow from chamber 342 to chamber 340. An especial advantage of the present invention is derived from the use of flexible double diaphragm assemblies to seal the respective chambers within the carbonator housing as the diaphragm assembly reciprocates. Large frictional forces would be experienced with a conventional piston and its associated piston rod, and, as a result, maintenance would present problems. However, substantially no metal-to-metal contact occurs during the operation of the device of the present invention. Instead, the flexible diaphragms ease the reciprocal movement of the assembly and prevent frictional forces from hindering the operation of the subject invention and causing maintenance problems with respect thereto. As such, the device of the present invention offers a new, unique, and highly useful apparatus for use in a coin-operated beverage vending installation and amounts to a substantial contribution to the carbonator art.

While the present invention has been described with specific reference to a carbon dioxide-water contacting device especially adapted for use in a beverage vending installation, it will be obvious to one skilled in the art that the gas-liquid contacting apparatus of the present invention may be usefully employed in many other environments (i.e., the device may be employed in a wide variety of gas-liquid contact processes).

It should be understood that various changes, modifications, and alterations may be effected in the details of operation and assembly for the various components illustrated and described herein, without departing from the spirit and the scope of the present invention, as defined in the appended claims.

What is claimed is:

1. A gas-liquid contacting device comprising:
   a housing;
   a reciprocable assembly, including first and second diaphragm means, slidably positioned in the housing for movement between a first position and a second position,
   the first diaphragm means cooperating with the housing to define a first chamber therein, said first chamber having a minimum volume when the reciprocable assembly is in its first position and a maximum volume when the reciprocable assembly is in its second position,
   the second diaphragm means cooperating with the housing to define a second chamber therein, said second chamber having a maximum volume when the reciprocable assembly is in its first position and a minimum volume when the reciprocable assembly is in its second position, and
   the effective area of the first diaphragm means presented to the first chamber being larger than the effective area of the second diaphragm means presented to the second chamber;
   gas inlet means in the housing and communicating with the first chamber;
   liquid inlet means in the housing and communicating with the second chamber;
   gas-liquid mixture outlet means in the housing and communicating with the first chamber;
   fluid passageway means defining a passageway external to the housing for connecting the first and second chambers; and
   valve means for controlling fluid flow through the external passageway means,
   whereby, at a time when the reciprocable assembly is in its first position, liquid can be introduced into the second chamber and then gas can be introduced into the first chamber, thereby causing the reciprocable assembly to move to its second position and liquid to flow from the second chamber to the first chamber through the external pasageway means such that a gas-liquid mixture can be withdrawn from the first chamber.

2. A gas-liquid contacting device, as claimed in claim 1, wherein the first chamber defined by the housing and by the first diaphragm means comprises a main portion and a premixing portion in fluid communication therewith, the gas inlet means and the external passageway means being in fluid communication with the premixing portion of the first chamber, whereby the gas and liquid are initially contacted in the premixing portion of the first chamber and thereafter are further contacted in the main portion thereof.

3. A gas-liquid contacting device, as claimed in claim 1, wherein the connecting means includes a spray nozzle at the juncture of the external passageway and the housing whereby liquid flowing from the second chamber through the external passageway is sprayed into the first chamber.

4. A gas-liquid contacting device, as claimed in claim 1, and further comprising spring means normally biasing the reciprocable assembly toward its first poistion.

5. A gas-liquid contacting device, as claimed in claim 1, and further comprising means for varying the stroke length through which the said assembly reciprocates whereby to adjust the volume of liquid that may be introduced into the said second chamber.

6. A gas-liquid contacting device, as claimed in claim 1, and further comprising:
   first solenoid valve means for controlling the flow of gas through the gas inlet means;
   second solenoid valve means for controlling the flow of liquid through the liquid inlet means; and
   third solenoid valve means for controlling the flow of gas-liquid mixture through the mixture outlet means.

7. A gas-liquid contacting device, as claimed in claim 6, and further comprising means, responsive to movement of the reciprocable assembly, adapted to control the first and third solenoid valve means.

8. A carbonator device adapted for use in a beverage vending installation comprising:
   a housing having a large diameter portion and a small diameter portion;
   a reciprocable assembly including a first and a second flexible diaphragm slidably positioned in the housing for movement between a first position and a second position,
   the first diaphragm cooperating with the large diameter portion of the housing to define a first chamber in the housing,
   the second diaphragm cooperating with the small diameter portion of the housing to define a second chamber in the housing,
   reciprocation of the assembly between its first and second positions being adapted to inversely vary the volumes of the first and second chambers, and
   the effective area of the first diaphragm presented to the first chamber being larger than the effective area of the second diaphragm presented to the second chamber;
   a carbon dioxide inlet communicating with the first chamber;
   a water inlet communicating with the second chamber;
   a carbonated water outlet in communication with the first chamber;
   connecting means defining a passageway external to the housing for connecting the first and second chambers; and
   a check valve for controlling the flow of water through the passageway.

9. A carbonator device, as claimed in claim 8, wherein the first chamber defined by the first diaphragm and by the housing comprises a main portion and a premixing portion in fluid communication therewith, the connecting means and the carbon dioxide inlet being in fluid communication with the premixing portion of the first chamber, whereby the carbon dioxide and water are initially contacted in the premixing portion of the first chamber and thereafter are further contacted in the main portion thereof.

10. A carbonator device, as claimed in claim 8, wherein the connecting means includes a spray nozzle at the juncture of the external passageway and the large diameter portion of the housing, whereby liquid flowing through the external passageway is sprayed into the first chamber for admixture with the carbon dioxide therein.

11. A carbonator device, as claimed in claim 8, and further comprising spring means normally biasing the reciprocable assembly toward its first position of maximum second chamber volume and minimum first chamber volume.

12. A carbonator device, as claimed in claim 8, and further comprising means for varying the stroke length through which the said assembly reciprocates whereby to adjust the volume of water that may be introduced into the said second chamber.

13. A carbonator device, as claimed in claim 8, and further comprising:
   a first solenoid valve for controlling the flow of carbon dioxide through the carbon dioxide inlet means;
   a second solenoid valve for controlling the flow of water through the water inlet; and
   a third solenoid valve for controlling the flow of carbonated water through the carbonated water outlet.

14. A carbonator device, as claimed in claim 13, and further comprising means, responsive to movement of the reciprocable assembly, adapted to control the first and third solenoid valves.

References Cited
UNITED STATES PATENTS

| 833,257 | 10/1906 | Southey et al. | |
|---|---|---|---|
| 2,672,089 | 3/1954 | Johnson | 261—82 |
| 3,109,873 | 11/1963 | Hotchkiss. | |
| 3,226,099 | 12/1965 | Black et al. | 261—35 |

HARRY B. THORNTON, *Primary Examiner.*

T. R. MILES, *Assistant Examiner.*